Patented Sept. 27, 1932

1,879,912

UNITED STATES PATENT OFFICE

ALBRECHT SCHMIDT, OTTO ERNST, AND HEINRICH LANGE, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ALKYL NAPHTHALENES AND PROCESS FOR PREPARING THE SAME

No Drawing. Application filed October 25, 1926, Serial No. 144,167, and in Germany October 28, 1925.

Our present invention relates to the preparation of alkyl naphthalenes.

The alkylation of naphthalene by means of alkyl halides has hitherto been realized only in a very unsatisfactory manner. Attempts to effect the entrance of the alkyl group into the naphthalene nucleus by the use of aluminium chloride, ferric chloride or another condensing agent of a similar strong action alone, have proved that in these cases either no alkylation takes place, as for instance when alkylating with methyl chloride, but the naphthalene molecules combine with each other, or there is only, as for instance when alkylating with ethyl chloride, formation of a small quantity of ethyl naphthalenes. Nor are zinc chloride or zinc oxide alone capable of causing an appreciable reaction.

Now we have found that when using metal halides and metal oxides or other compounds capable of binding hydrochloric acid, for instance zinc chloride and zinc oxide or small quantities of iron chloride and zinc oxide, the alkylation of naphthalene or its derivatives or substitution products by means of alkyl halides takes place in a surprisingly perfect manner. Even the alkyl chlorides, which, although their reactivity is the lowest of the alkyl halides, are the most important for technical use, react easily in our new process. The reaction is preferably carried out in a closed vessel at a temperature from 160° C. to 180° C. The simultaneous use of a metal halide and an agent capable of binding hydrochloric acid permits industrial manufacture of homologues of the naphthalene without any formation of by-products such as dinaphthyl. The kind and quantity of the metal halide to be added may be varied within wide limits according to the character of the alkyl halide. By fractional distillation of the reaction products the substitution products may be separated, which are useful for the chemical industry, and fractions may be formed which can be utilized as "special" oils, for instance as lubricating oils for refrigerating machines.

The following examples serve to illustrate our invention but are not intended to limit it thereto:

(1) 512 kg. of naphthalene, 320 kg. of zinc oxide, 250 kg. of zinc chloride and 600 kg. of methyl chloride are heated in a closed vessel for 4 hours, while stirring, to 170–180° C. At the beginning of the heating operation, the pressure rises up to about 45 atmospheres, but as soon as the temperature exceeds 160° C. the pressure drops until the end of the reaction. After 4 hours the heating is stopped. From the resulting reaction products an oil with a greenish fluorescence is obtained with a yield of 627 kg., of which 587 kg. can be easily taken off from the zinc mud after slight heating, whereas the remaining quantity of 40 kg. can be obtained in the usual manner by extraction. The yield amounts to 122 parts by weight calculated on 100 parts by weight of the naphthalene. The oil can be distilled without any further preliminary treatment.

(2) 256 kg. of naphthalene, 136 kg. of zinc chloride, and 40 kg. of magnesium oxide are heated in a closed vessel, while stirring, with about 400 kg. of methyl chloride to 170–180° C. whereby the pressure rises up to about 42 to 44 atmospheres. The pressure falls somewhat in the course of the reaction, until it becomes finally steady at a constant temperature. The reaction is then finished. After separation of the unattacked starting material there remain 200 kg. of oils. The latter can be worked up as set forth in Example 1.

(3) 256 kg. of naphthalene, 160 kg. of zinc oxide and 5 kg. of iron chloride are heated in a closed vessel with 400 kg. of methyl chloride to 170–180°, while stirring. The reaction proceeds as stated in Examples 1 and 2. After separation of the unattacked naphthalene there remain 205 kg. of an oil which are worked up in the usual manner.

(4) 256 kg. of naphthalene, 136 kg. of zinc chloride, 160 kg. of zinc oxide and 450 kg. of ethyl chloride are heated in a closed vessel for about 4 hours to 160–170° C., while stirring. The pressure rises to 26 atmospheres and then gradually falls at a constant temperature. Thus 360 kg. of oils are obtained. These oils are worked up as stated in the foregoing examples.

We claim:

1. The process which comprises causing methyl chloride to act at a temperature of from 160° to 180° C. and at a superatmospheric pressure up to about 45 atmospheres upon naphthalene in the presence of zinc chloride and zinc oxide.

2. The process which comprises causing an alkyl halide to act at a temperature of from 160° C. to 180° C. and at a superatmospheric pressure up to about 45 atmospheres upon naphthalene in the presence of a metal chloride condensation catalyst and of an oxide of a bivalent metal of the group consisting of zinc and magnesium.

3. The process which comprises causing methyl chloride to act at a temperature of from 160° C. to 180° C. and at a super-atmospheric pressure up to about 45 atmospheres upon naphthalene in the presence of a metal chloride condensation catalyst and of an oxide of a bivalent metal of the group consisting of zinc and magnesium.

4. The process which comprises causing methyl chloride to act at a temperature of from 160° C. to 180° C. and at a super-atmospheric pressure up to about 45 atmospheres upon naphthalene in the presence of a metal chloride condensation catalyst and of zinc oxide.

5. The process which comprises causing an alkyl halide to act at a temperature of from 160° C. to 180° C. and at a super-atmospheric pressure up to about 45 atmospheres upon naphthalene in the presence of zinc chloride and zinc oxide.

In testimony whereof, we affix our signatures.

ALBRECHT SCHMIDT.
OTTO ERNST.
HEINRICH LANGE.